Aug. 7, 1928.  
R. CHILTON  
STARTER MECHANISM  
Filed March 19, 1926

INVENTOR
ROLAND CHILTON

ATTORNEY

Patented Aug. 7, 1928.

1,679,602

UNITED STATES PATENT OFFICE.

ROLAND CHILTON, OF KEYPORT, NEW JERSEY, ASSIGNOR, BY MESNE ASSIGNMENTS, TO AEROMARINE STARTER COMPANY, INC., A CORPORATION OF NEW YORK.

STARTER MECHANISM.

Application filed March 19, 1926. Serial No. 95,952.

This invention relates to the class of mechanism wherein a very high rate of power output is obtained for a short period from a flywheel energized to high speed, over a longer period from a relatively low powered source.

Starters for internal combustion engines exemplify such short time high power needs where the effective use of a relatively low powered source is of great advantage, and such an embodiment of the present invention is here shown.

One of the principal objects of this invention is to provide the mechanism wherein the energy of a rapidly rotating flywheel is transmitted to smoothly accelerate a startable means from rest, and wherein great inertia in the starting means may be overcome through unyielding driving connections.

The principal difficulty in utilizing the great energy which may be stored in a relatively light flywheel when brought up to very high speed lies in devising a practicable mechanism whereby the rapidly rotating wheel can be connected to the engine to be started without destructive shocks. My Patent No. 1,561,506, Nov. 17th, 1925, covers a gear train having a clutch set to slip at a predetermined load for this purpose.

This construction has been very successful, especially in connection with large engines, such as used in aircraft, and having relatively low flywheel effects, but the amount of clutch slippage increases with the inertia of the parts to be started and represents a loss of power which increasingly detracts from the starter efficiency on engines, such as those of Diesel type, for instance, which have relatively massive flywheels. For such applications, the present invention provides a transmission mechanism for connecting the rapidly rotating starter flywheel to the engine without shock and wherein no slippage and consequent wear between the parts and loss of power results, however heavy the engine flywheel or other moving parts to be started, may be.

These advantages are herein achieved by using a suitable, variable ratio power transmitting means having an initial zero-ratio at the instant of establishing connection between the starter flywheel and the engine, which latter is then smoothly accelerated by a progressive increase in the transmission ratio.

The form of transmission means shown in this disclosure consists essentially of a fusee shaft connected to an engine starting drum by a chain anchored at or very near to the axis of the fusee shaft and adapted to wrap thereabout on a spiral path extending from the point of anchorage. It will be seen that the speed of the chain is proportional to its effective radius on the fusee and that when the effective radius is zero, as in the initial position (Fig. 2) where the anchor pin and chain are radially aligned the chain speed is instantaneously zero, accelerating to the velocity of the anchor pin during approximately the first quarter turn. One of the features of this invention resides in keeping the acceleration during this movement down to that subsequently developed by the increasing radius as the chain proceeds to wrap spirally on the fusee and upon itself. Thus the increase in radius during the subsequent proximate quarter turns should approximate the radius of the anchor pin or, in the case where the chain wraps on itself, this radius should be less than the thickness of the chain.

In the prior art when a flexible member is anchored to the periphery of a drum of great radius compared to the thickness of the member, the increase in radius during the first quarter turn from a radial position would be many times greater than the increase in radius due to the wrapping in each successive quarter turn so that the initial acceleration would be excessive. A high reduction gear train is preferably used between the flywheel and the fusee shaft, and connecting means between the low speed shaft of this gear train and the fusee, and between the driven drum and engine, are preferably inter-connected for simultaneous engagement when the flywheel has been brought up to speed, and for simultaneous disengagement, automatically responsive to the complete unwinding of the chain from the driven drum, or to the starting of the engine.

The automatic means responsive to the unwinding of the chain from the driven drum comprises a radially movable anchor member securing one end of the chain to the drum and it is a special feature of this particular construction that it automatically removes all driving load from the system before the connection clutches are disconnected, which operation might cause damage, if carried out under load.

Means, such as a spring conveniently wound within the driven drum, is provided to return the apparatus to the normal position, i. e., with the chain fully wound upon the driven drum and entirely unwound from the fusee and with the anchor pin in the latter in the line of chain pull from the axis of rotation. This is the initial starting position and is specifically preferred because it provides shockless acceleration from zero velocity, in spite of the apparent practical necessity for disposing the anchor pin slightly away from the theoretical center of the fusee, in order to give this member a substantial root section about which a suitable chain may be spirally conformed.

Various other objects and advantages of the invention will be in part obvious from an inspection of the accompanying drawings and a careful consideration of the following particular description and claims of one form of mechanism embodying my invention.

In the drawings:

Figure 4 is a fragmentary end view of Fig. 1.

Figure 1:
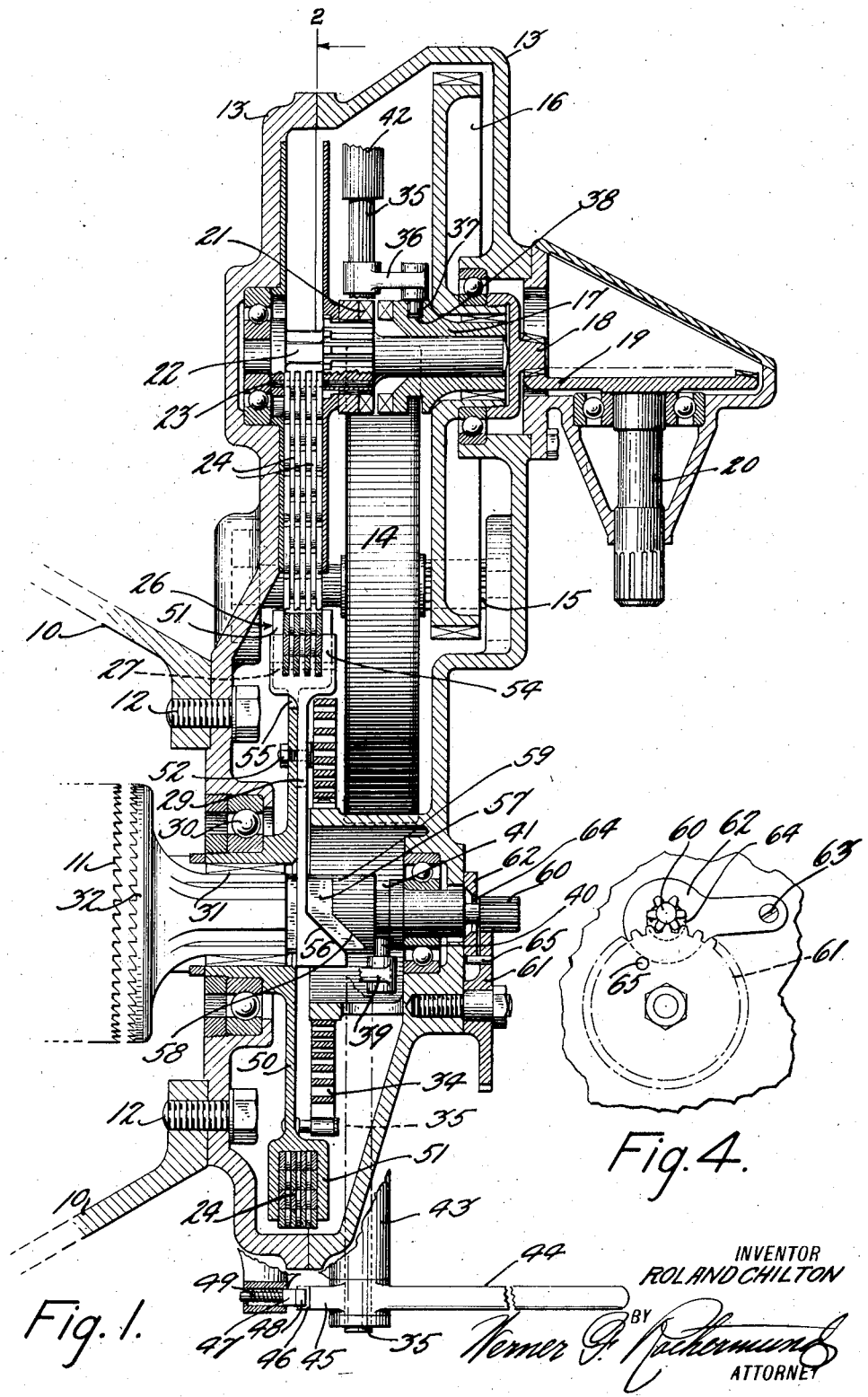
Figure 1 is a vertical section, and illustrates the invention as attached to an engine for the starting of same.

In the present instance 10 designates a portion of an engine casing and 11 a starting jaw secured to the crankshaft. To the casing 10 there is attached by means such as the screws 12, the starter casing 13, in which there is rotatably supported a flywheel 14 having a pinion 15, and meshing with this pinion in a high reduction gear 16 which drives an axially shiftable clutch member 17. The gear 16 is provided with a bevel pinion 18 meshing with a companion gear 19 which has connection with a shaft 20 driven from any suitable means such as a handcrank or a motor for the initial operation of the flywheel to high speeds.

The clutch member 17 is adapted, when axially shifted, to engage for rotation the jaws 21, forming a part of a fusee shaft 22 to which is connected by means of an anchor pin 23 disposed as near to the axis of the shaft 22 as possible, one end of a drive chain 24. The other end of the chain is connected to a driven drum 26 by means of a pin 27 disposed in a radially shiftable member 29 associated with the driven drum, the operation of this member being more fully described hereinafter.

The drum 26 is rotatably supported in a bearing 30 and is provided with splines 31 which drivably engage an axially shiftable driving jaw 32 adapted to mesh with the starting jaw 11. A spring 34 tends under normal non-driving conditions to keep the drive chain 24 wound upon the drum 26.

Both the clutch member 17 and the jaw 32 are moved simultaneously into their respective meshed positions by a control shaft 35. A lever arm 36 having connection with the shaft 35 is provided with a pin 37 engaged in an annular groove 38 formed in the member 17, and a lower lever arm 39, also provided with a pin 40, and having connection with the shaft 35 engages the shiftable jaw 32 by means of said pin and an annular groove 41.

The control shaft 35 is rotatably supported in an upper bearing 42 and a lower bearing 43 preferably formed on the starter casing 13. An operating handle 44 is secured to the shaft and a portion 45 having a V formed end 46 is adapted to engage a spring pressed plunger 47 also having a V formed end 48. A means is thus provided by which the control shaft 35 can not assume an intermediate position, and said means thus functions to maintain the clutch member 17 and the jaw 32 in either a fully meshed or a fully demeshed position. The spring 49 also tends to accelerate the motion of the handle 44 in either direction when the intermediate position has been passed and will cause a snappy meshing or demeshing movement of the engaging parts.

It will be seen that the drum 26 is provided with a web portion 50 and an outer annular portion 51 substantially U shaped in cross section in which the chain 24 rests when wound upon the drum. The radially shiftable member 29 hereinbefore mentioned is slidably connected to the web 50 of the drum by means of a screw 52 and slot 53, said member being provided with an outer U shaped portion 54 of a conformation similar to the annular portion 51 of the drum and disposed within a driving slot 55 therein. The lower portion of this member 29 is provided with angular cam faces 56 and straddles a flat 57 formed on either side of the cylindrical extension 59 of the jaw 32, said flats being cut to provide an angular face 58 on either side to be engaged by cam faces 56, of the member 29 when the same is moved radially outward.

It will be seen that the positive and shockless connection between the rotating flywheel and the stationary engine, depends upon the connection being made with the fusee at zero ratio position and that should engagement accidently occur with the mechanism set at a substantial driving ratio, serious shock and probably destruction of the parts would occur in the absence of a slipping clutch, or equivalent additional mechanism. Accordingly, a safety device is incorporated which locks the control in inoperative position except when the fusee is at the desired zero ratio position, which it could fail to reassume, as from failure or jamming of the spring 34. The operator will thus be warned that the parts have not returned to the correct starting position by this safety device, which, in Figs. 1 and 4 is illustrated as follows:—

On the end of the cylindrical extension 59 of the jaw 32, there is formed a small pinion 60, and mounted for rotation on the starter casing is a gear 61 meshing with this pinion. A latch 62, is mounted on the casing by a screw 63, for vertical oscillation of its free end, and an opening 64 is provided therein to permit under certain conditions the passage of the pinion 60 and axial movement of the jaw 32. A pin 65 is fixed in the gear 61 to lift the latch member 62 to a position so as to clear and permit passage of the pinion through said opening only when the gear has been rotated to the position shown in Fig. 1. It should be understood that the ratio between the gear and pinion is such that the gear will make less than one revolution during the winding up process of the chain upon the drum 26, and the gear should be set or timed so that the pin 65 will have moved the latch 62 to the position shown in Fig. 1 only when the chain is in the correct starting position as shown in Fig. 2.

Figure 2:
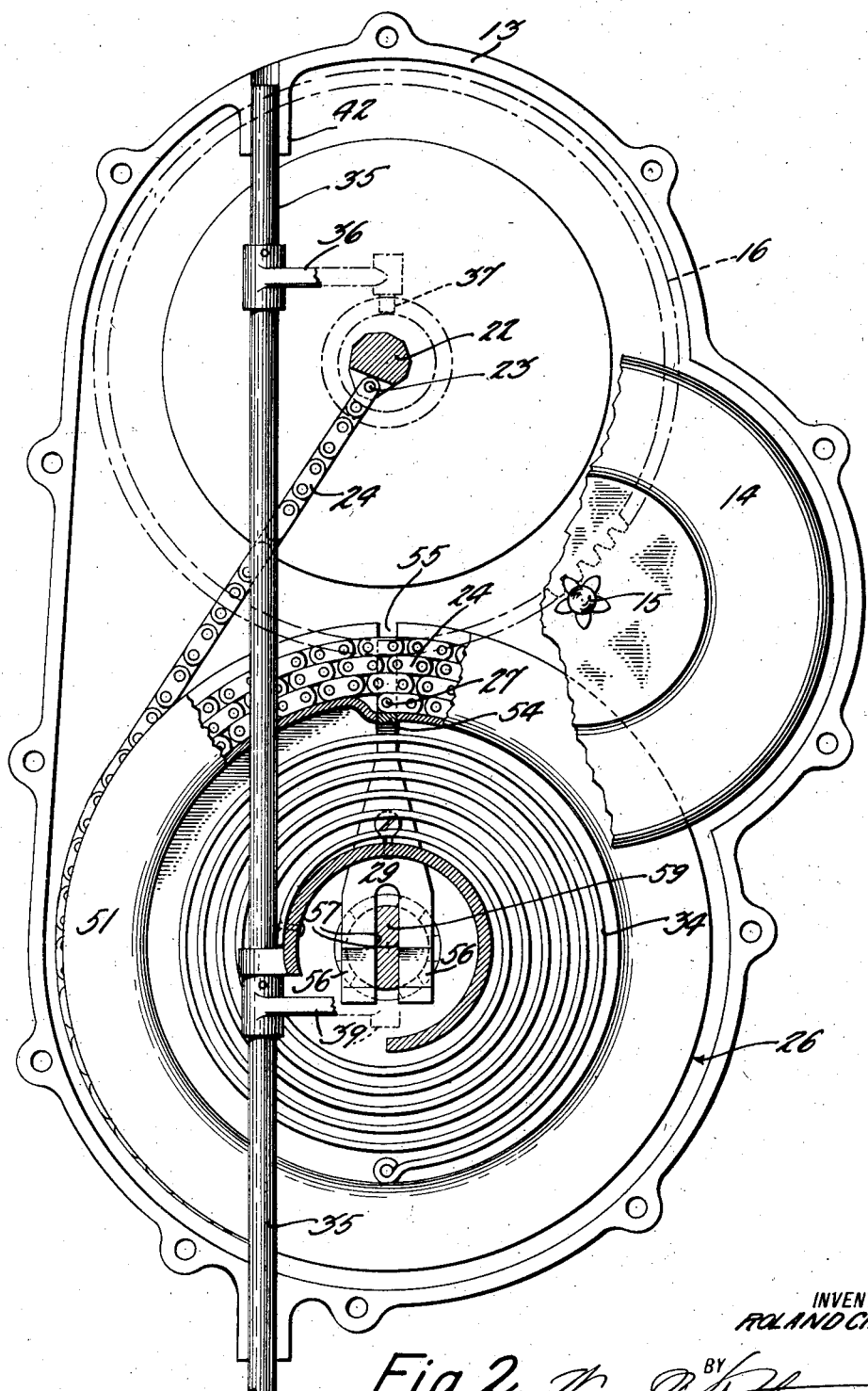
Figure 2 is a section taken substantially on the line 2—2 looking in the direction indicated by the arrows.
Figure 3:
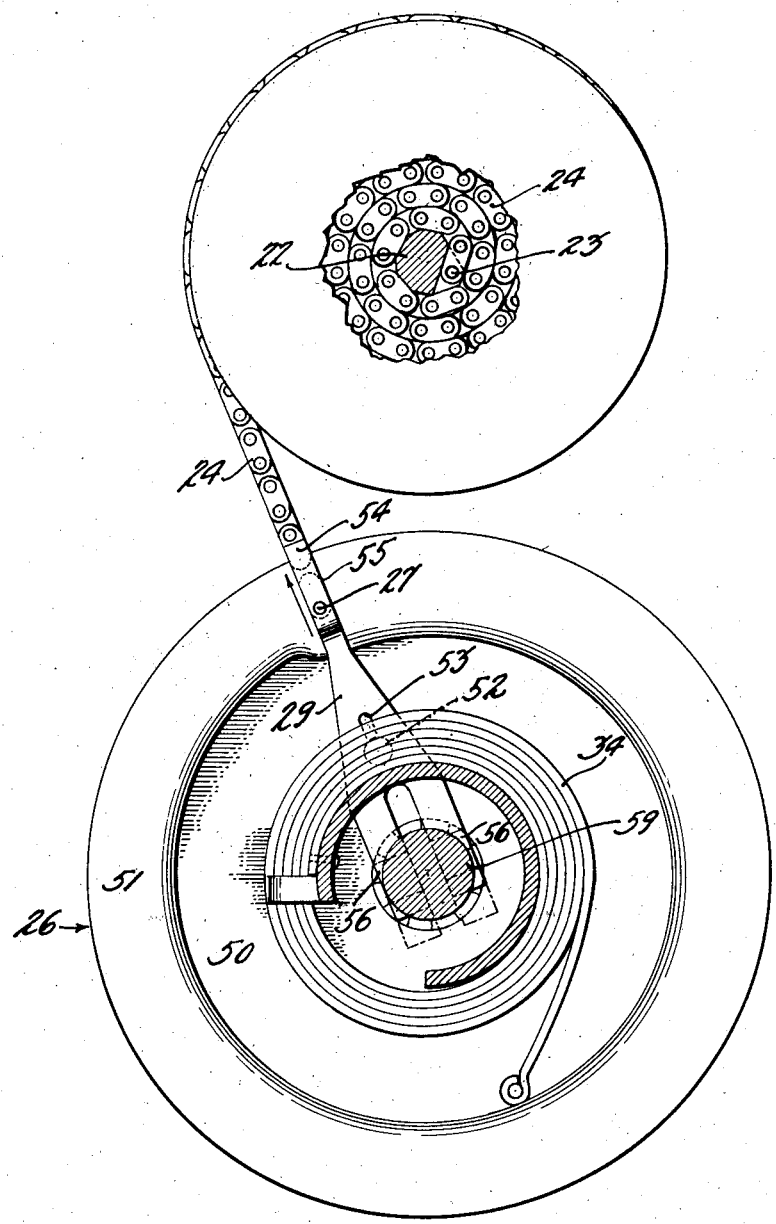
Figure 3 is a view similar to Fig. 2 showing the parts in an operated position.

With reference to Figs. 2 and 3 it will be seen that the fusee shaft 22 is of peculiar formation in cross section so as to permit the chain to wind up evenly and spirally thereon as shown in Fig. 3.

In operation, assuming the parts in their initial position as shown in Figs. 1 and 2, the flywheel 14 is cranked or driven to high speed from the shaft 20 through the gears 16, 19 and pinion 18. When high velocity of the flywheel has been attained, the handle 44 is operated thereby meshing the clutch member 17 with the fusee shaft 22, the same operation also causing the jaw 32 to mesh with the starting jaw 11 of the engine. The fusee shaft accordingly, rotates with low speed gear 16, and the chain 24 will wind up on the shaft and unwind from the drum 26 which will cause a rotation of the jaw 32, slowly at first and gradually accelerating to its highest speed as the chain wraps up on itself.

As the end of the chain 24, passes the point of tangency with the drum and approaches the position of Fig. 3 a progressive deceleration of the drum will occur and, in the radial position of that figure the driving load of the chain must cease because of its anchorage to the radially movable shift member 29, which will accordingly be pulled outwardly and so demesh the jaw 32 from the engine by the action of the cam faces 56 and 58, and also demesh the clutch 17 from the fusee shaft through the interconnecting control shaft 35, whereupon the stopped chain, fusee and drum will be turned backwards to the original or starting position by the spring 34.

Many forms or variable gear are known to the art and some have the desired, initial zero setting and the use of any of the latter, in combination with a rapidly rotatable flywheel for the smooth acceleration from rest of a means to be started, is considered to be within the scope of this invention. Similarly where a different number of engine turns than may be obtained from a convenient number of turns of chain upon the drum or fusee or where a reduction of load upon the chain is desirable, gearing means may be interposed between the driven drum and the engine shaft. Also any convenient form of power may be used for energizing the flywheel, but it is a special feature of this type of starter that it so multiplies the rate of power output that muscular cranking energy may be used to give high cranking speed to engines otherwise beyond the strength or endurance of an operator.

Whereas the present invention has been shown and described as constituting a transmission in an engine starter, it should be understood however that the same is not restricted exclusively for use in conjunction with the apparatus herein disclosed, it being at once apparent that the transmission in its broad aspect is applicable to most any form of mechanism requiring a uniformly progressive increase in the transmission ratio.

Variations may be resorted to within the scope of the invention and portions of the improvement may be used without the others, whilst not departing from the spirit of the invention.

Having thus described my invention, I claim:

1. In apparatus of the class described, the combination of a driving member, a chain connected to the driving member at a point closely adjacent the axis of said member, and adapted to wrap around said axis on a path extending spirally from the point of chain anchorage, a driven drum engaged by the chain, a flywheel adapted to be accelerated to high speed from a source of power, a reduction gear train between the flywheel and the driving member, and means to connect the driving member and the drum respectively to the flywheel and to a means to be started.

2. In apparatus of the class described, the combination of a driving member, a chain adapted to wrap around the driving member axis on a path extending spirally from a point of chain anchorage near said axis, a driven drum engaged by the chain, a flywheel adapted to be accelerated to high speed from a source of power, a reduction gear train between the flywheel and the driving member, and means to connect the driving member and the drum respectively to the flywheel and to a means to be started, and automatic means to separate said connections when the chain is unwound from the drum.

3. In a driving mechanism, the combination of a driving member, a chain anchored to the driving member adjacent the axis thereof and adapted to wrap around the axis on a path extending spirally from the point of anchorage, a driven drum engaged by the chain, a flywheel adapted to be accelerated to high speed from a source of power, a reduction gear train between the flywheel and the driving member, separable means adapted to connect the driving member and the drum respectively to the flywheel and to a means to be started, and anchor means for the chain on the drum radially movable by the unwrapping of the chain from the drum and adapted to then sever said separable means.

4. In apparatus of the class described, the combination of a driving member, a driven drum, a chain connected to the drum and initially wound thereon said chain adapted to wrap around the driving member axis on a path extending spirally from a point of chain anchorage near said axis, a flywheel adapted to be accelerated to high speed from a source of power a reduction gear train between the flywheel and a driving member, separable means adapted to connect the driving member and the drum respectively to the flywheel and to a means to be started, and anchor means for the chain on the drum radially movable by the unwrapping of the chain from the drum and adapted to then sever said separable means, and further means adapted to thereupon return the mechanism to its initial position with the chain wound on the drum.

5. A mechanical movement for shocklessly accelerating an initially stationary mass to be started from a mass moving at high velocity, comprising in combination, a driving member adapted to drivably engage the moving mass, a driven member adapted to engage the means to be started, and a driving means unyieldingly connecting said members and giving a driving ratio therebetween increasing from an initial zero setting to maximum speed; said driving means adapted to cause a disengagement of the driven member from the means to be started when maximum speed is reached.

6. In a power drive, a high speed flywheel, a fusee shaft, a drum drivably engageable with a means to be driven, a pliable means wound upon the drum and having its free end connected to the fusee shaft at or near the axis thereof, means to drivably connect the fusee shaft to the speeding flywheel to wind the pliable means upon said shaft for the smooth acceleration of the means to be driven from rest, and means adapted to prevent the drum from becoming engaged with the driven means except when the pliable means is fully wound thereon.

7. In a driving mechanism, the combination of a driven drum, a drive chain therefor, a profiled drive shaft, an anchor means for the chain eccentrically disposed on the shaft, the whole adapted for the wrapping of the chain about said profile on a spiral path increasing in radius by more than the amount of said eccentricity during each turn.

8. In a driving mechanism, the combination of a chain, a drive shaft having a profile adapted for the wrapping of the chain on a constant pitch spiral path originating at the shaft axis, and an anchor means for the chain disposed on said path within one turn of said origin.

9. In apparatus of the class described, the combination of a drive shaft, a drive chain adapted to wrap about the shaft, means for drivably anchoring the end of the chain to the shaft so disposed that the line of chain pull may initially pass thru the shaft axis and subsequently be moved away therefrom in substantially constant proportion to the rotation of the shaft.

10. In apparatus of the class described, the combination of a drive chain, a drive shaft profiled for spiral wrapping of the chain, an anchor pin disposed at a radius from the shaft axis so proportioned to the pitch of said spiral that the longitudinal acceleration of the chain while said radius rotates from an initial position in line with the chain, to a position normal thereto, does not greatly exceed the acceleration developed during subsequent wrapping on said spiral path.

11. In apparatus of the class described, the combination with an initially stationary means to be started and a power means, of a first drive member adapted to drivably engage the power means, a second drive member adapted to engage the means to be started, and a flexible driving means of substantial thickness between said drive members initially wound upon itself about the second said drive member; said flexible means having its free end connected to the first said member at a root radius not in excess of said thickness.

12. In apparatus of the class described, the combination with an initially stationary means to be started and a power member, of a first drive member adapted to drivably engage the power member, a second drive member adapted to engage the means to be started, a flexible driving means between said drive members initially wound upon itself and the second said drive member, and having its free end connected to the first said drive member, and means adapted to automatically disengage both of said drive members when said flexible means has been unwound.

13. In apparatus of the class described, the combination of a driving and a driven member, a driving connection therebetween adapted to cause a gradual acceleration of the driven member from zero to maximum velocity, and means adapted to automatically cause a discontinuance of the driving effort when maximum velocity has been reached.

14. In a driving mechanism, the combination with a driving and a driven means, of a driving member comprising a shaft adapted for connection to the driving means, a driven member comprising a drum adapted for connection to the driven means, a drive transmitting chain having one end connected to said drum and normally wound thereon when at rest; the other end of said chain being connected to said shaft closely adjacent to the shaft axis; said shaft being so formed in cross section as to permit of the chain being uniformly coiled thereabout in spiral formation.

15. In a driving mechanism, the combination with a driving and a driven means, of a driving member comprising a shaft adapted for connection to the driving means, a driven member comprising a drum adapted for connection to the driven means, a flexible member adapted to transmit drive therebetween and comprising a multiplicity of inter-connected elements; one end of said flexible member being connected to said drum and the other end being connected to said shaft closely adjacent its axis; said shaft being so formed in cross section as to permit the elements of said flexible member being spirally wound thereon so as to be in close mutual contact.

16. In a driving mechanism, the combination of a driving member comprising a shaft, a driven member comprising a drum, a drive transmitting means therebetween comprising a flexible element having one end connected to said shaft and extending therefrom to said drum upon which the major portion of said flexible element is initially wound; the connection of said element with the shaft being so disposed relative to the shaft axis that the rate of longitudinal travel of said element will be substantially less at starting than the peripheral speed of the shaft.

17. In apparatus of the class described in combination, a drive chain, a profiled shaft, a chain anchor means thereon, the whole adapted to longitudinally accelerate the chain from an initial radial disposition of rest to engagement with said profile and then to maintain substantially the same rate of acceleration during subsequent spiral wrapping of the chain thereabout.

18. In apparatus of the class described in combination, a drive chain, a drive shaft having a profile adapted for the spiral wrapping and unwrapping of the chain, an anchor means at the inner end of the said spiral adapted for movement of the chain between engagement with the inner end of the profile and an initial radial disposition of rest at substantially the same longitudinal chain acceleration as that due to the spiral.

19. A driving mechanism comprising in combination, a high speed shaft, a driving member connectable to said shaft, a driven member drivably connectable to a means to be driven, a transmission between said members giving a speed ratio therebetween uniformly increasing from an initial zero setting, and means for drivably connecting said members respectively to said shaft and to said means to be driven.

20. In apparatus of the class described, the combination of a power means, a power shaft, a drum engageable with a means to be driven, a pliable means wound upon the drum and having its free end connected to the power shaft adjacent the axis thereof, and means adapted to drivably connect the power shaft to the power means simultaneously with the engagement of the drum with the means to be driven.

21. In apparatus of the class described, the combination with a shaft to be driven, of a drum engageable with said shaft, a drive shaft adapted for connection with a power means, an element windable upon the shaft at a progressively increasing radius starting from closely adjacent the shaft axis, retractive means adapted to keep said element wound upon the drum when the apparatus is inactive, a reduction gear train between the power means and the drive shaft, and means adapted to cause an engagement of the drive shaft with the power means.

22. In apparatus of the class described, the combination of a driving member engageable with a rotary power means, a driven member engageable with a means to be started, and an unyielding transmission means having an initial setting of zero ratio between said members when said engagements are effected and adapted to thereupon progressively increase said ratio for the shockless acceleration from rest of the means to be started.

23. In apparatus of the class described the combination with a means to be started from rest, of a rotatable power shaft; a positive driving connection therebetween adapted for simultaneous engagement with each; said connection having a driving ratio that is adapted to increase from zero whereby said means' may be started without shock and gradually accelerated.

Signed at Keyport, in the county of Monmouth, and State of New Jersey this 17th day of March, A. D. 1926.

ROLAND CHILTON.